Patented Mar. 2, 1943

2,312,967

UNITED STATES PATENT OFFICE 2,312,967

CHEMICAL PROCESS AND PRODUCT

William Edward Hanford, Wilmington, Del., assignor to E. I. du Pont de Nemours & Company, Wilmington, Del., a corporation of Delaware No Drawing. Application July 18, 1940,
Serial No. 346,143

12 Claims. (Cl. 260—404)

This invention relates to certain new and useful long-chain aliphatic aminoacyl compounds and to methods for their preparation.

It is an object of this invention to provide certain new and useful long-chain monamino acids. Still another object is to furnish a direct and simple process for the preparation of these compounds. Other objects will be apparent from the following description of the invention.

These objects are accomplished by the following invention which comprises converting the keto group to an amino group in compounds of the general formula

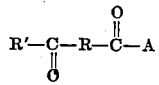

wherein A is —OH, —OR″, $NH_2$, —OM, —$ONH_4$, halogen or

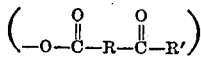

R is a bivalent open-chain organic radical containing at least 4 atoms, R′ is a monovalent open-chain organic radical containing 3 to 12 atoms, R″ is an alkyl group, and M is a metal. By the process of this invention there are obtained aliphatic monoaminomonocarboxylic acids having a straight chain of at least 16 atoms and a radical length of at least 7, the amino group being attached to a carbon atom in the chain. Such compounds may be represented by the formula

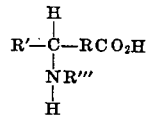

wherein R is a bivalent open-chain organic radical containing at least 4 atoms, R′ is a monovalent open-chain organic radical containing 3 to 12 atoms, and R‴ is hydrogen or a monovalent open-chain hydrocarbon radical, R and R′ may be heteroatomic, containing oxygen, nitrogen, or sulfur in addition to carbon and hydrogen. The preferred compounds are those in which R‴ is hydrogen and which have chain lengths of 18 to 22 atoms and a radical length of 10 to 15 atoms. By "radical length" is meant the number of atoms in the chain N—C—R—C in the above formula. The monoamino carboxylic acids of this invention may be produced from the corresponding keto acids or keto acid derivatives by catalytic hydrogenation in the presence of ammonia or primary amines, using elevated temperatures and superatmospheric pressures, followed by hydrolysis, or by reacting the amide or ester with formamide or with a substance capable of liberating formamide under the conditions of reaction, followed by hydrolysis.

By the above process new compositions of matter are obained which have the general formula:

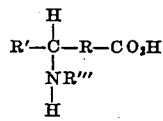

wherein R, R′, and R″′ have the significance given hereinbefore. Amino acids falling within this general class may be enumerated as follows: 9-aminopalmitic acid, 9-aminostearic acid, 13-aminobehenic acid, 10-aminostearic acid, 12-aminostearic acid, 14-aminobehenic acid, 11-aminostearic acid, 13-aminostearic acid, 9-aminomargaric acid, 6-aminopalmitic acid, 9-amino-5-thiatricosanoic acid, 9-amino-12-thiatricosanoic acid, 9-amino-5-oxatricosanoic acid, as well as the corresponding N-methyl, N-butyl, N-octyl, N-octadecyl, N-cyclohexyl, N-phenyl and N-9-octadecenyl compounds.

The following examples set forth certain well defined instances of the application of this invention. They are, however, not to be considered as limitations thereof, since many modifications may be made without departing from the spirit and scope of this invention.

*Example I*

In an autoclave fitted with a stirrer were placed 100 parts of 12-ketostearin (prepared as described in U. S. Patent 2,178,760) and 50 parts of anhydrous ammonia. The mixture was heated rapidly to 150° C. and maintained at that temperature with stirring for 7 hours. A pressure of 800 to 1,000 lbs./sq. in. was developed. At the end of this time the ammonia was allowed to escape through an overhead vent, and the molten 12-ketostearamide was removed from the autoclave. Treatment with charcoal and recrystallization from ethyl alcohol gave 61.5 parts of 12-ketostearamide melting at 120° to 122° C.

Analysis: Calc'd. for $C_{18}H_{35}O_2N$=N, 4.72. Found=N, 4.55.

A mixture of 100 parts of 12-ketostearamide, prepared as above, 15 parts of an alloy-skeleton nickel catalyst, 1.7 parts of ammonium chloride, and 213 parts of methanol was placed in a stainless steel autoclave fitted with a stirrer. Anhydrous ammonia (67 parts) was added and the reaction mixture was heated to 130° C. with stirring. Sufficient hydrogen was added to maintain a pressure of 1500 to 1700 lbs./sq. in. and the reaction mixture was stirred and held at a temperature of 130° C. for 2.5 hours. The reaction mixture was cooled, removed from the autoclave, and the nickel catalyst separated by filtration. The methanol solution was then added with stirring to 1500 parts of water and the precipitated crude 12-aminostearamide was separated by filtration. The crude 12-aminostearamide was treated with a solution of 67 parts of glacial acetic acid in 1000 parts of water, as described in U. S. application Serial No. 346,139, filed on even date herewith, now U. S. Patent 2,283,683, issued May 19, 1942, and the insoluble material was removed by filtration. A slight excess of 28% aqueous ammonium hydroxide was added to the well-stirred aqueous acetic acid solution, and the precipitated 12-aminostearamide was separated by filtration. Recrystallization from methanol gave 60 parts of 12-aminostearamide melting at 86° to 88° C.

Analysis: Calc'd. for $C_{18}H_{38}ON_2$=N, 9.39. Found=N, 9.30.

A mixture of 100 parts of 12-aminostearamide prepared as above, 38 parts of sodium hydroxide, and 380 parts of water was refluxed until evolution of ammonia had ceased. The solution was then cooled to room temperature, diluted with an equal volume of water, stirred with 3 parts of charcoal, and filtered. The filtrate was diluted with water to approximately 10 times its original volume and stirred vigorously while 30% aqueous acetic acid was added slowly until the pH of the mixture was 7 to 8. The amino acid precipitated by this change in pH was separated by filtration. Recrystallization from 80% aqueous tertiary-butanol gave 70 parts of 12-aminostearic acid melting at 137° to 138° C.

Analysis: Calc'd. for $C_{18}H_{37}O_2N$=N, 4.65. Found=N, 4.63.

12-aminostearic acid is a white microcrystalline powder. It is soluble in hot aqueous tertiary-butanol and in aqueous organic acids, and slightly soluble in benzene, the lower aliphatic alcohols, and cyclohexanol. It is insoluble in lubricating oil.

Example II

A mixture of 100 parts of 12-ketostearamide, prepared as described in Example I, 20 parts of anhydrous ammonia, and 3 parts of an alloy-skeleton nickel catalyst was placed in an autoclave. The reaction mixture was heated rapidly to 130° C., hydrogen was added to maintain a pressure of 1700 to 2000 lbs./sq. in., and the reaction mixture was held at this temperature and pressure for 2 hours. At the end of this time the mixture was cooled to room temperature and the crude 12-aminostearamide was removed from the reaction vessel, dissolved in methanol, and purified as described in Example I. There was obtained 85 parts of 12-aminostearamide melting at 86° to 88° C.

A mixture of 100 parts of 12-aminostearamide, prepared as above, 430 parts of 25% aqueous acetic acid, and 43 parts of concentrated sulfuric acid was refluxed for 6 hours. The reaction mixture was cooled and the solid upper layer consisting of the amino acid salt was removed, washed with water, and heated for one hour with 200 parts of 5% aqueous ammonium hydroxide. The amino acid was then separated by filtration and recrystallized from 80% aqueous tertiary-butanol, there being obtained 74.3 parts of 12-aminostearic acid melting at 137° to 138° C.

Example III

A well-stirred mixture of 100 parts of castor oil and 10 parts of nickel-on-kieselguhr catalyst was treated with hydrogen in a metal autoclave for one hour at a temperature of 130° C. and a pressure of 2000 lbs./sq. in. The pressure was then lowered to atmospheric and dehydrogenation of the 12-hydroxystearin to 12-ketostearin was effected by raising the temperature to 275° C. for six hours. The temperature was then lowered, 50 parts of anhydrous ammonia was added, and the reaction mixture was heated at 150° C. for 8 hours to form 12-ketostearamide. At the end of this time sufficient hydrogen was added to maintain a pressure of 2000 lbs./sq. in., and heating was continued for 3.5 hours at 150° C. The crude 12-aminostearamide thus obtained was purified as described in Example I, there being obtained 35 parts of 12-aminostearamide melting at 86° to 88° C. Hydrolysis to 12-aminostearic acid was effected as described in Examples I and II.

Example IV

A mixture of 100 parts of 12-ketostearic acid, 330 parts of methanol, 300 parts of water, 14.5 parts of sodium hydroxide, 1.7 parts of ammonium chloride, and 17 parts of an alloy-skeleton nickel catalyst was placed in a reaction vessel. After addition of 83 parts of anhydrous ammonia, the reaction mixture was heated at 150° C. for 2 hours. It was then treated with hydrogen for 3 hours at 150° C., the initial hydrogen pressure being 2000 lbs./sq. in. The reaction mixture was removed from the reaction vessel, while still hot enough to maintain a clear solution, and the suspended catalyst was removed by filtration. The filtrate was diluted with water to a total volume of 8300 parts, and dilute acetic acid was added with stirring until the solution was neutral. The crude 12-aminostearic acid thus precipitated was removed by filtration. Recrystallization from 80% aqueous tertiary-butanol gave 62 parts of 12-aminostearic acid melting at 128° to 133° C. Reprecipitation from aqueous formic acid solution as described in U. S. application Serial No. 346,139, filed on even date herewith, afforded the pure amino acid melting at 137° to 138° C.

Example V

One hundred parts of oleic acid was placed in a 3-necked reaction vessel fitted with a thermometer, stirrer, and dropping funnel. Thirty-three parts of concentrated sulfuric acid was added dropwise with stirring over a period of 1.5 hours, keeping the temperature of the reaction mixture at 10° to 20° C. The reaction mixture was cooled overnight, diluted with 5 times its weight of ice-water, and heated under reflux. The oily upper layer was separated, washed with hot water, and heated with alcoholic potassium hydroxide for one hour. After acidification with dilute sulfuric acid, the oily layer was separated, washed with water, diluted with petroleum ether, and cooled. The material which precipitated was removed by filtration and washed with petroleum ether. There was obtained 55 parts of white crystalline 9(10)-hydroxystearic acid, which after recrystallization melted at 78° to 79° C. and had an acid number of 182 (average); 187 (theory).

A mixture of 100 parts of 9(10)-hydroxystearic acid and 450 parts of methanol was refluxed for seven hours. During this period dry hydrogen chloride was added for 5 minutes at the start of the reaction and for 5 minutes each after the second and fifth hours of heating. The reaction mixture was cooled, diluted with a large volume of water, and extracted with ether. The ether solution was washed with aqueous sodium carbonate solution and with water, dried over calcium chloride, and filtered. Distillation of the ether solution gave 88 parts of colorless methyl 9(10)-hydroxystearate boiling at 182° to 184° C. at 1 mm. The saponification number was 179.7 (average); 178.6 (theory); the acid number was 1.3 (average); 0.0 (theory); and the hydroxyl number was 174.5 (average); 178.6 (theory).

A mixture of 100 parts of methyl 9(10)-hydroxy-stearate, prepared as above, and 5 parts of nickel-on-kieselguhr catalyst was heated to 285° C. Evolution of hydrogen began at a temperature of about 215° C., and the theoretical amount was evolved in an overall heating schedule of 3 hours. The catalyst was removed by filtration of the molten mixture. Distillation gave 83 parts of colorless methyl 9(10)-ketostearate boiling at 180° to 190° C. at 2 mm. This material had a saponification number of 176.8 (average); 179.9 (theory); an hydroxyl number of 7.5 (average); 0.0 (theory); and an acid number of 7.5 (average); 0.0 (theory).

A mixture of 100 parts of methyl 9(10)-ketostearate, prepared as above, and 50 parts of anhydrous ammonia was heated in a closed metal reaction vessel with shaking for 6 to 8 hours at 150° C. At the end of this time the excess ammonia was allowed to escape and the crude reaction product was recrystallized from methanol. There was obtained 78.3 parts of 9(10)-ketostearamide melting at 95° to 98° C. The white, crystalline keto amide is soluble in the lower aliphatic alcohols.

A mixture of 100 parts of 9(10)-ketostearamide, prepared as above, 43 parts of methanol, 0.5 part of ammonium chloride, 10.6 parts of alloy-skeleton nickel catalyst, and 53 parts of anhydrous ammonia was placed in a closed metal reaction vessel and heated to 140° C. with shaking. Sufficient hydrogen was then added to maintain a pressure of 2000 lbs./sq. in., and heating was continued at 140° C. for 3 hours. At the end of this time the reaction mixture was removed, dissolved in methanol, and filtered to remove the catalyst. The excess methanol was removed by distillation, water was added, and the precipitated material was separated by filtration. The crude amino amide was dissolved in a mixture of 53 parts of glacial acetic acid and 2600 parts of water, and the insoluble material was removed by filtration, as described in U. S. application Serial No. 346,139, filed on even date herewith. The filtrate was neutralized with sodium hydroxide, and the precipitated material was removed by filtration, washed with water, and recrystallized from methanol. There was obtained 61.7 parts of white, crystalline 9(10)-aminostearamide melting at 67° C., and soluble in the lower aliphatic alcohols.

Analysis: Calc'd. for $C_{18}H_{38}ON_2$=N, 9.39. Found=N, 9.45.

A mixture of 100 parts of 9(10)-aminostearamide, prepared as above, 68 parts of sodium hydroxide, and 680 parts of water was refluxed for 100 hours. At the end of this time the alkaline solution was treated with charcoal and filtered. The crude aminostearic acid was precipitated by adjusting the pH of the alkaline solution to 7 to 8 by addition of 20% aqueous acetic acid. The crude 9(10)-aminostearic acid thus obtained (100 parts) was recrystallized from 80% aqueous tertiary-butanol to obtain a mixture of pure 9- and 10-aminostearic acids. The melting point of the mixture ranges from 105° to 153° C. depending on the ratio of the two acids.

Analysis: Calc'd. for $C_{18}H_{37}O_2N$=N, 4.68. Found=N, 4.63.

9(10)-aminostearic acid is a white, micro-crystalline powder, soluble in hot aqueous tertiary butanol and aqueous organic acids, and slightly soluble in benzene and the lower aliphatic alcohols.

In the practice of this invention there may be used any compound falling within the general formula:

wherein A is —OH, —OR'', —NH$_2$, —OM, —ONH$_4$, halogen or

R is a bivalent open-chain organic radical containing at least 4 atoms, preferably 7 to 13 atoms, R' is a monovalent open-chain organic radical, preferably containing 3 to 12 atoms, R'' is an alkyl group, and M is a metal.

Any hydrogenation catalyst may be used to promote the conversion of the ketoacyl compound to the corresponding aminoacyl compound. In the examples various types of supported and unsupported nickel catalyst have been employed. In general, any of the hydrogenating-dehydrogenating metals, such as nickel, cobalt, iron, copper, cadmium, zinc, tin, platinum, palladium, silver, etc., are satisfactory, although nickel catalysts are preferred. In addition any other catalysts effective for reduction of carbonyl groups may be used.

Pressures above the vapor pressure of ammonia may be used for carrying out the reaction. In general, the upper limit of the pressure is determined by the operating safety limit of the apparatus in which the reaction is carried out. In general, the reaction may be carried out at temperatures from about 25° C. to about 200° C., the exact temperature used depending upon the pressure adopted for the reaction as well as upon the catalyst selected. Generally the reaction is carried out at temperatures in the range of 75° to 170° C.

Various lengths of time may be allotted for the hydrogenation reaction. A period of initial heating with ammonia before introduction of hydrogen may be desirable but is not necessary. Since satisfactory results are obtained by simultaneous admission of ammonia and hydrogen to the reaction mixture, it should be emphasized that the entire process of preparing the amino amide may be carried out in one step; e. g., castor oil can be successively hydrogenated, dehydrogenated, and hydrogenated in the presence of ammonia to 12-aminostearamide without isolation or purification of intermediates, using the same catalyst and reaction vessel throughout. The resulting amide is then hydrolyzed to the acid.

In conducting the chemical reaction various substituted formamides and formamide-producing materials may be used; for example, ammonium formate is a very satisfactory reducing agent since it liberates formamide under the conditions of reaction.

As described in the examples, alkalies, mineral acids, or organic acids may be used to effect hydrolysis of the aminoacyl derivatives to the amino acids. Concentrations are not critical, provided a stoichiometric amount of the hydrolyzing reagent is present, although higher concentrations will materially reduce the time necessary for complete hydrolysis to take place. High-pressure hydrolysis utilizing water is also suitable. A suitable method of alkaline hydrolysis involves refluxing a 20% solution of 12-aminostearamide in 10% aqueous sodium hydroxide for 24 to 48 hours, or until evolution of ammonia has ceased. A preferred acid hydrolysis involves refluxing for 6 hours a mixture of 100 parts 12-aminostearamide, 430 parts of 25% aqueous acetic acid, and 43 parts of concentrated sulfuric acid.

The products obtained as described herein have the general formula:

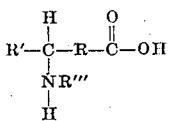

wherein R is a bivalent open-chain organic radical containing at least 4 atoms, preferably 7 to 13 atoms, R' is a monovalent open-chain organic radical, preferably containing 3 to 12 atoms, and R'' is hydrogen or a monovalent open-chain hydrocarbon radical.

The examples show methods for the production of 12-aminostearic acid and 9(10)-aminostearic acid. Examples of other monoaminocarboxylic acids that may be produced by this process include 9-aminopalmitic, 13-aminobehenic, 14-aminobehenic, 11-aminostearic, 13-aminostearic, 9-aminomargaric, 6-aminopalmitic, 9-amino-5-thiatricosanoic, and 9-amino-5-oxatricosanoic.

The esters, salts, and other derivatives may be obtained from the preformed acids by esterification with the requisite alcohol, neutralization with bases, etc.

The amino acids and their derivatives prepared in the manner described above are valuable as polyamide intermediates. The long-chain length and the unique position of the amino group with respect to the carboxyl group make possible the formation of novel polyamides having properties which make them very desirable for use in the coating of fabrics, metals, and miscellaneous materials, as unsupported films and foils, and as durable, tough elastic fibers, threads, filaments, and bristles. In addition, these amino acids and their derivatives are attractive intermediates for the preparation of compounds for various pharmaceutical purposes, as bactericides, insecticides, preservatives, etc. The surface activity of such long-chain materials also makes them desirable intermediates for the preparation of wetting agents, detergents, and similar materials.

It is apparent that many widely different embodiments of this invention may be made without departing from the spirit and scope thereof and therefore it is not intended to be limited except as indicated in the appended claims.

I claim:

1. A process which comprises reducing at a temperature between 25° C. and 200° C. the ketone group to an amino group in compounds of the general formula:

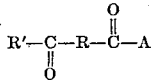

wherein A is selected from the class consisting of —OH, —OR'', —NH$_2$, —OM, —ONH$_4$, halogen and

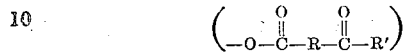

R is a bivalent open-chain organic radical containing at least 4 atoms in the chain, said chain being selected from the class consisting of carbon atom chains and carbon atom chains in which some of the carbon atoms are replaced with a member of the group consisting of oxygen, sulfur and nitrogen, R' is a monovalent open-chain hydrocarbon radical of 3 to 12 carbon atoms in the chain, R'' is an alkyl group, and M is a metal, followed by hydrolysis of the resulting product thereby obtaining compounds of the general formula:

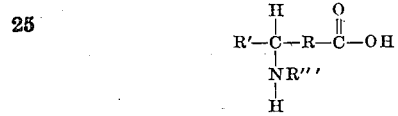

wherein R and R' have the above indicated significance, and R''' is selected from the class consisting of hydrogen and monovalent open-chain hydrocarbon radicals.

2. A process which comprises bringing a compound of the general formula

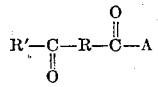

wherein A is selected from the class consisting of —OH, —OR'', —NH$_2$, —OM, —ONH$_4$, halogen, and

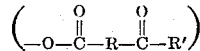

R is a bivalent open chain organic radical containing at least 4 atoms in the chain, said chain being selected from the class consisting of carbon atom chains and carbon atom chains in which some of the carbon atoms are replaced with a member of the group consisting of oxygen, sulfur and nitrogen, R' is a monovalent open chain hydrocarbon radical of 3 to 12 carbon atoms in the chain, R'' is an alkyl group, and M is a metal, in the liquid phase into contact with hydrogen and a compound selected from the group consisting of ammonia, and primary amines, in the presence of a hydrogenation catalyst at a temperature between 25 and 200° C. and hydrolyzing the resulting product thereby obtaining a compound of the general formula

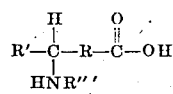

wherein R and R' have the above indicated significance, and R''' is selected from the class consisting of hydrogen and monovalent open chain hydrocarbon radicals.

3. The process in accordance with claim 2 in which the reaction is carried out in the presence of ammonia, R' has a chain length of 3 to 12 atoms, and the radical length is 10 to 15 atoms.

4. The process in accordance with claim 2 in which the hydrogenation reaction is carried out at a temperature between 75° and 170° C.

5. A compound having the general formula

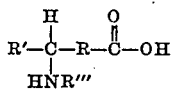

wherein R is a bivalent open chain organic radical containing at least 4 atoms in the chain, said chain being selected from the class consisting of carbon atom chains and carbon atom chains in which some of the carbon atoms are replaced with a member of the group consisting of oxygen, sulfur and nitrogen, R' is a monovalent open chain hydrocarbon radical of 3 to 12 carbon atoms in the chain, and R''' is selected from the class consisting of hydrogen and monovalent open chain hydrocarbon radicals.

6. A compound having the general formula

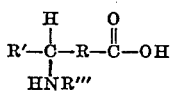

wherein R is a bivalent open chain organic radical containing from 4 to 12 atoms in the chain, said chain being selected from the class consisting of carbon atom chains and carbon atom chains in which some of the carbon atoms are replaced with a member of the group consisting of oxygen, sulfur and nitrogen, R' is a monovalent open chain hydrocarbon radical of from 3 to 12 carbon atoms in the chain, and R''' is selected from the class consisting of hydrogen and monovalent open chain hydrocarbon radicals.

7. A 12-amino-stearic acid.
8. A 9(10)-aminostearic acid.
9. An alkali metal salt of 12-aminostearic acid.
10. The process which comprises reducing at a temperature within the range of 25° to 200° C. the keto group in an amide having the general radical formula

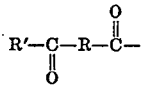

wherein R is a bivalent open chain organic radical containing at least 4 carbon atoms, and R' is a monovalent open chain hydrocarbon radical containing 7 to 12 carbon atoms, and hydrolyzing the resulting product, thereby obtaining the corresponding acid.

11. The process which comprises reducing at a temperature within the range of 25° to 200° C. the keto group in an ester having the general radical formula

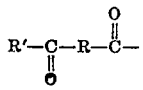

wherein R is a bivalent open chain organic radical containing at least 4 carbon atoms, and R' is a monovalent open chain hydrocarbon radical containing 7 to 12 carbon atoms, and hydrolyzing the resulting product, thereby obtaining the corresponding acid.

12. A new chemical compound, 12-aminostearic acid, which when crystallized from an 80% aqueous tertiary-butanol solution is a white microcrystalline powder melting at 137° to 138° C. and having the property of being insoluble in lubricating oil.

WILLIAM EDWARD HANFORD.

CERTIFICATE OF CORRECTION.

Patent No. 2,312,967.  March 2, 1943.

WILLIAM EDWARD HANFORD.

It is hereby certified that error appears in the printed specification of the above numbered patent requiring correction as follows: Page 1, first column, line 18, for "NH$_2$" read -- -NH$_2$ --; and second column, line 7, for "obained" read --obtained--; page 4, first column, line 33, for "R''" read --R''''--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.